US012737483B2

(12) United States Patent
Vuksani et al.

(10) Patent No.: US 12,737,483 B2
(45) Date of Patent: Sep. 15, 2026

(54) TECHNIQUES FOR ENCRYPTING BUS COMMUNICATIONS

(71) Applicant: BAE Systems Information and Electronic Systems Integration Inc., Nashua, NH (US)

(72) Inventors: Era Vuksani, Bedford, NH (US); Osvy Rodriguez, Palm Bay, FL (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 339 days.

(21) Appl. No.: 18/421,088

(22) Filed: Jan. 24, 2024

(65) Prior Publication Data

US 2025/0238533 A1 Jul. 24, 2025

(51) Int. Cl.
*G06F 21/60* (2013.01)

(52) U.S. Cl.
CPC .......... *G06F 21/606* (2013.01); *G06F 21/602* (2013.01)

(58) Field of Classification Search
CPC ............................. G06F 21/606; G06F 21/602
See application file for complete search history.

(56) References Cited

U.S. PATENT DOCUMENTS

2021/0231005 A1* 7/2021 Vehra ................ H04L 12/40182
2023/0055859 A1* 2/2023 Prentice .............. H04L 12/4013
2024/0291688 A1* 8/2024 Coffin ................ H04L 12/4013

OTHER PUBLICATIONS

"Review and Rationale of MIL-STD-1553 A and B," Data Device Corporation (DDC). Upated Feb. 12, 1980 and Sep. 8, 1986. 61 pages.

* cited by examiner

*Primary Examiner* — Kibrom T Hailu
(74) *Attorney, Agent, or Firm* — Gary McFaline

(57) ABSTRACT

An apparatus includes a first module configured to communicatively couple a first device to a communication bus. The first module is configured to transmit, over the bus, first data at a first frequency to a second module that is communicatively coupled to a second device; and to transmit, over the bus, second data at a second frequency to a third module that is communicatively coupled to a third device. The bus may be implemented with a standard communication protocol (e.g., MIL-STD-1553). The first module may include transceiver, encoding/decoding, and cryptography circuitry, and allows for both standard-compliant communications to the third device via a primary communication protocol (the bus standard compliant protocol) as well as communications to the second device via a secondary communication protocol (e.g., a proprietary protocol), over the same bus, thus allowing backwards compatibility for the primary protocol and opportunity for secure communications using the secondary protocol.

19 Claims, 8 Drawing Sheets

Legend

Encrypted communication in accordance with first communication protocol 115 (frequency F1)

Un-encrypted communication in accordance with second communication protocol 117 (frequency F2)

Legend

Encrypted communication in accordance with first communication protocol 115 (frequency F1)

Un-encrypted communication in accordance with second communication protocol 117 (frequency F2)

TECHNIQUES FOR ENCRYPTING BUS COMMUNICATIONS

FIELD OF DISCLOSURE

The present disclosure relates to communication over a communication bus, and more particularly, to techniques for encrypting bus communications.

BACKGROUND

MIL-STD-1553 is a communication protocol utilized in military vehicles, especially aircrafts, that enables communications between components. For example, version B of MIL-STD-1553 standard defines a multiplex data bus system that includes three main components: a bus controller, a number of remote terminals, and a bus monitor for serving encoded messages. In general: the bus controller can initiate data transmission tasks, and schedules what transmissions can be sent and at what time; the remote terminals provide a data-access interface allowing the transmission and reception of data under the control of the bus controller as well as data parsing; and the bus monitor may monitor and analyze communication between the bus controller and remote terminals. There remain a number of nontrivial issues with a bus operating in accordance with such standards.

Figure 1:
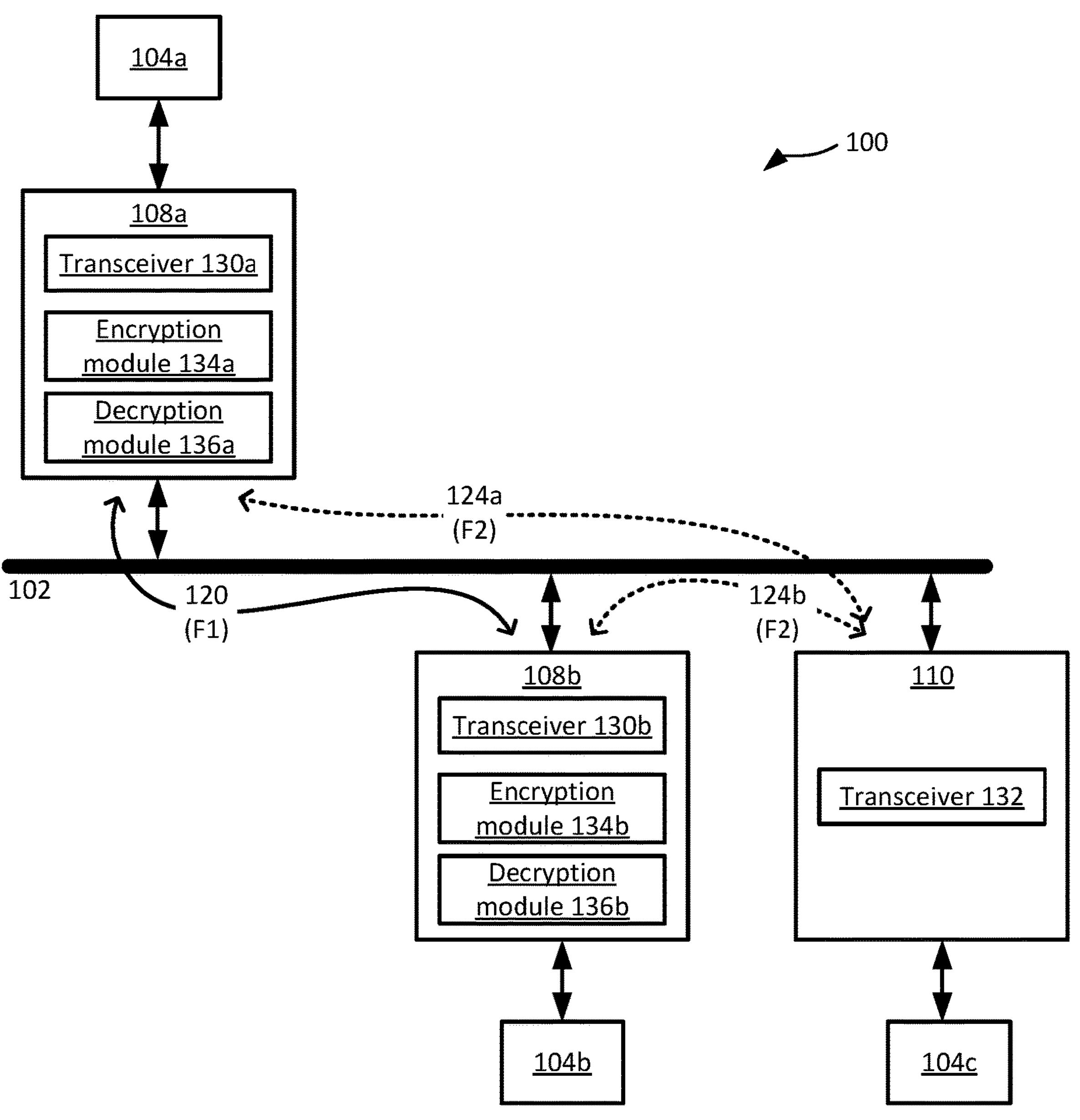
FIG. 1 schematically illustrates a system comprising (i) a communication bus for communication between a plurality of devices, (ii) a first module configured to communicatively couple a first device of the plurality of devices to the bus, (iii) a second module configured to communicatively couple a second device of the plurality of devices to the bus, and (iv) a third module configured to communicatively couple a third device of the plurality of devices to the bus, wherein the first module is configured to transmit encrypted data to the second module in accordance with a first communication protocol and over the bus, and wherein the first module is configured to transmit unencrypted data to the third module in accordance with a second communication protocol and over the bus, in accordance with an embodiment of the present disclosure.

Although the following detailed description will proceed with reference being made to illustrative examples, many alternatives, modifications, and variations thereof will be apparent in light of this disclosure.

DETAILED DESCRIPTION

Techniques are described for encrypting bus communications. The techniques are particularly useful for use with communication busses such as those configured to operate in accordance with the MIL-STD-1553 communication protocol and/or IEEE-1394 communication protocol (which is similar to the MIL-STD-1553 communication protocol), but can be used with other insecure communication protocols as well. In accordance with an example, a system includes a communication bus, a plurality of devices, and a plurality of modules, where each module communicatively couples a corresponding device to the bus. In one such example, the communication bus is a MIL-STD-1553 bus, one of the devices is a bus controller, and two of the other devices are remote terminals, and the modules each include a transceiver as well as a processing circuit configured to selectively encrypt outgoing communications or decrypt incoming communications as needed, and as further described below. In one such example, a first module communicatively coupled to the first device (e.g., bus controller) is configured to: (i) transmit, over the bus, first data at a first frequency to a second module that is communicatively coupled to a second device (e.g., remote terminal A); and (ii) transmit, over the bus, second data at a second frequency to a third module (e.g., remote terminal B) that is communicatively coupled to a third device. In such a case, the second frequency may be 1 MHz, which is the standard frequency of MIL-STD-1553, and the first frequency may be much higher than the second frequency so as to support higher data throughput (e.g., such as 10 MHz, or more). In an example operation scenario, the first data transmitted by the first module to the second module at the higher frequency is encrypted by the first module, and the second data transmitted by the first module to the third module at the standard frequency of the bus is not encrypted by the first module. The techniques provide a number of benefits. For example, the techniques allow for backwards compatibility, in that the first module can communicate both unencrypted data with the third module over the bus at the standard bus frequency, in accordance with the MIL-STD-1553 protocol, as well as encrypted data with the second module over the same bus at a higher frequency. More generally, the first frequency can be any frequency to facilitate efficient encrypted communication. Also, encrypting communication between the first and second modules reduces chances of intercept by a malicious party or otherwise unintended recipient. Numerous configurations and variations will be apparent in light of this disclosure.

General Overview

As mentioned herein above, there remain a number of nontrivial issues with a bus operating in accordance with communication protocols such as MIL-STD-1553 and IEEE-1394 (firewire). For example, current MIL-STD-1553 buses have no security built into them. As such, communications of such a bus can be read in the clear, manipulated, and sent to any destination and subsystems that communicate on the bus. An attack of the bus and/or its components, such as denial of service (DoS) attack, can negatively impact mission success, especially on moving vehicles or platforms. A possible solution is to use bus encryption. However, due to temporal and spatial constraints, added cryptography and security with minimal changes to infrastructure are very challenging and have been unsuccessful. Extensive existing system overhauls to remove or significantly alter the given bus (e.g., MIL-STD-1553) and attached components are prohibitively expensive, effectively requiring new systems. Thus, techniques that allow for encrypting bus communications with backwards compatibility and fewer infrastructure changes would be useful.

Accordingly, techniques are described herein to selectively use encrypted communication over a bus. The techniques described herein can be used for any communication bus, and is particularly advantageous for the MIL-STD-1553 bus and other insecure communication bus technologies. Note that the techniques described herein are backwards compatible, as a first module can (i) transmit encrypted communication in accordance with a first communication protocol over the bus to a second module, and (ii) transmit unencrypted communication in accordance with a second communication protocol over the bus to a third module, where the third module may be a legacy module that doesn't support communication of encrypted data. Furthermore, the encrypted transmission in accordance with the first communication protocol may occur at a relatively higher frequency F1 over the bus, whereas unencrypted transmission in accordance with the second communication protocol over the bus may occur at a lower frequency F2. In an example, F2 may be the standard frequency of the MIL-STD-1553 standard (1 MHz), or a given frequency of any other communication bus standard being used. Frequency F1 may be, for example, a proprietary frequency, or another standard frequency that is different than F1, or any frequency that is suitable for a relatively high data rate via the encrypted channel over the bus. In some cases, F1 is higher than F2 by at least 1 MHz, or at least 2 MHz, or at least 5 MHz, or at least 10 MHz, for example. In an example, the frequency F1 is greater than 5 MHz, or 7 MHz, or 10 MHz, or 12 MHz. In an example, the frequency F1 is about 15 MHz and F2 is about 1 MHz.

Encrypting the communication between two modules and over the bus prevents or reduces chances of a malicious terminal successfully reading the messages transmitted over the bus. Furthermore, a malicious terminal plugged in the bus expects messages to be transmitted over the bus at frequency F2, whereas the encrypted messages are transmitted at frequency F1. This further reduces chances of the malicious terminal successfully decrypting and/or reading the messages transmitted over the bus.

In an example, multiple remote terminals and a bus controller may be communicatively coupled to the bus, although other devices may also be coupled to the bus. Each given device may be communicatively coupled to the bus through a corresponding intervening module. Some such modules may support both (i) communication in accordance with the first communication protocol (e.g., encrypted communication at frequency F1) and (ii) communication in accordance with the second communication protocol (e.g., unencrypted communication at frequency F2). Some other legacy modules may support communication in accordance with the second communication protocol (e.g., unencrypted communication at frequency F2), and not the first communication protocol. Modules that support the first and second communication protocols may also be backwards compatible with other modules that doesn't support the first communication protocol (and supports only the second communication protocol).

In an example, the modules supporting both the first and second communication protocols may comprise one or more processors, gate level arrays, circuits, application specific integrated circuits (ASICs), field programmable gate arrays (FPGAs), central processing units (CPUs), graphics processing units (GPUs), and/or other appropriate types of processing units.

Assume an example scenario that includes a first device, a second device, and a third device communicatively coupled to the bus, through a first module, a second module, and a third module, respectively, although many more remote terminals and one bus controller can be communicatively coupled to the bus. Also assume that each of the first and second modules supports communication using both first and second communication protocols, whereas the third module supports communication using the second (but not the first) communication protocol.

Discussed below is an example scenario where the first device is to transmit first data to the second device over the bus, where each of the first and second modules supports communication using both the first and second communication protocols. In an example, communication between a device and a corresponding module is at frequency F2, irrespective of whether the corresponding module can support both first and second, or only the second communication protocol. Accordingly, when the first device is to transmit first data to the second device over the bus, the first device initially transmits the first data to the first module at the frequency of F2. The first module comprises a transceiver to receive and synchronize the first data. In some such examples, the first module further comprises a processing module that includes a decoder, a protocol determination module, an encrypt module, a decrypt module, and an encoder. The decoder of the first module decodes the first data, and converts a frequency of the first data from F2 to F1. Note that between the decoder and the encoder of the first module, data may be processed at the frequency of F1, irrespective of the transmission frequency of the data over the bus. The protocol determination module of the first module then determines whether the first data is to be transmitted over the bus to the second module in accordance with the first communication protocol (e.g., as encrypted data at frequency F1) or in accordance with the second communication protocol (e.g., as unencrypted data at frequency F2). For example, the protocol determination module determines a destination address of the first data, which is the second module or the associated second device in this example. Because the second module supports communication in accordance with both the first and second communication protocols, the protocol determination module determines that the first data from the first module to the second module is to be transmitted in accordance with the first communication protocol. Accordingly, the encryption module within the first module encrypts the first data, and the encoder within the first module encodes the data at the frequency F1, and facilitates transmission of the first data over the bus in accordance with the first communication protocol (e.g., as encrypted data at frequency F1).

The second module receives the first data from the bus, where the first data is being transmitted over the bus in accordance with the first communication protocol and at the frequency F1. The encrypted first data is parsed by a protocol determination module of the second module, which determines whether the first data is at the frequency F1 or F2 and/or determines whether the data is encrypted or unencrypted, e.g., based on a source address of the first data. As the source address of the received first data is the first module that supports both the first and second communication protocols, the protocol determination module determines that the first data is transmitted from the first module to the second module using the first communication protocol at frequency F1 and is encrypted. Accordingly, a decryption module of the second module decrypts the first data, and the decrypted data is encoded by an encoder of the second module. The encoder lowers the frequency of the first data from F1 to F2 (e.g., as the second device may receive data from the second module at frequency F2). The encoded data is then transmitted to the second device.

Discussed below is another example scenario where the first device is to transmit second data to the third device over the bus, wherein the first module supports both the first and second communication protocols, and wherein the third module supports the second (and not the first) communication protocol. Because the third module doesn't support encrypted communication in accordance with the first communication protocol using the frequency F1, the first module transmits to the third module in accordance with the second communication protocol and using the frequency F2. For example, the transmitted data is not encrypted by the first module in this example.

Discussed below is yet another example scenario where the third device is to transmit third data to the first device over the bus. Because the third module doesn't support encrypted communication in accordance with the first communication protocol, the third module transmits unencrypted third data to the first module in accordance with the second communication protocol and with the frequency F2. Numerous configurations and variations will be apparent in light of this disclosure.

Architecture

FIG. 1 schematically illustrates a system 100 comprising (i) a communication bus 102 for communication between a plurality of devices 104*a*, 104*b*, 104*c*, (ii) a first module 108*a* configured to communicatively couple a first device 104*a* of the plurality of devices to the bus 102, (iii) a second module 108*b* configured to communicatively couple a second device 104*b* of the plurality of devices to the bus 102, and (iv) a third module 110 configured to communicatively couple a third device 104*c* of the plurality of devices to the bus 102, wherein the first module 108*a* is configured to transmit encrypted data to the second module 108*b* in accordance with a first communication protocol 115 and over the bus 102, and wherein the first module 108*a* is configured to transmit unencrypted data to the third module 110 in accordance with a second communication protocol 117 and over the bus 102, in accordance with an embodiment of the present disclosure.

In an example, the bus 102 is a serial data bus. In an example, the bus 102 operates in accordance with the military standard MIL-STD-1553. The MIL-STD-1553 is a military standard published by the United States Department of Defense, where the standard defines mechanical, electrical, and/or functional characteristics of a serial data bus. The MIL-STD-1553 is widely used in avionic applications, such as in a manned-aircraft (e.g., fixed wing or helicopter), an unmanned aerial vehicle (UAV) or drone, a spacecraft, a projectile or missile, a telescope, for example. The MIL-STD-1553 may also be used for other appropriate applications as well. In another example, the bus 102 operates in accordance with the STANAG 3838 AVS standard adopted by North Atlantic Treaty Organization (NATO). In yet another example, the bus 102 operates in accordance with another appropriate standard.

In FIG. 1, the bus 102 is illustrated to include a single signal line. However, in another example, the bus 102 may have multiple redundant balanced line physical layers, such as dual or a higher number of redundant lines, as will be described below with respect to FIG. 2.

Referring again to FIG. 1, in one embodiment, one or more of the devices 104*a*, 104*b*, 104*c* may be remote terminals (RTs) communicatively coupled to the bus 102. For example, the devices 104*a*, 104*b*, 104*c* may be sensors, actuators, processors, controllers, and/or other onboard instruments communicating via the bus 102. In an example, at least one of the devices 104*a*, 104*b*, 104*c* may be a bus controller (BC) that broadcasts messages to the various other devices 104, such as broadcasts schedules in accordance with which various devices 104 are to share the bus 102 for communication. In some such examples, device 104*a* is a BC, and devices 104*b* and 104*c* are RTs that are configured similarly. In an example, the BC may also act as an RT.

In FIG. 1, three devices 104*a*, 104*b*, 104*c* are illustrated to be coupled to the bus 102, although any other appropriate number of devices may be coupled to the bus 102. In an example where the bus 102 operates in accordance with the MIL-STD-1553 standard, there may be up to 32 devices 104 (such as up to 31 RTs and one BC device) coupled to the bus 102. In one embodiment, the devices 104*a*, 104*b*, 104*c* may transmit various types of data to each other, such as data generated from a sensor, data to control an actuator, and/or any other appropriate type of data.

As illustrated in FIG. 1, the modules 108*a* and 108*b* that are respectively communicatively coupled to the devices 104*a* and 104*b* are of a first type, and the module 110 that is communicatively coupled to the device 110 is of a second type. Each of the modules 108*a*, 108*b*, for example, supports communication using dual communication protocols, whereas the module 110 supports communication using a single communication protocol. In such an example, the modules 108*a*, 108*b* support communication using a first communication protocol 115 and a second communication protocol 117. The first communication protocol 115 uses a first frequency F1 for communication over the bus 102, and the second communication protocol 117 uses a second frequency F2 for communication over the bus 102. In an example, one of the frequencies F1 or F2 may be a standard frequency for communication over the bus 102, and the other of the frequencies F1 or F2 may be a nonstandard frequency for communication over the bus 102.

In the example where the bus 102 operates in accordance with the MIL-STD-1553 standard, the frequency F2 is about 1 MHz, which may be the usual frequency for transmission over the bus 102. In such an example, the frequency F1 may be greater than the frequency F2, such as greater than the frequency F2 by at least 1 MHz, or at least 2 MHz, or at least 5 MHz, or at least 10 MHz, for example. In an example, the frequency F2 is less than 5 MHz, or less than 3 MHz, or less than 2 MHz. In an example, the frequency F1 is greater than 5 MHz, or 7 MHz, or 10 MHz, or 12 MHz. In an example, the frequency F1 is about 15 MHz.

Thus, each of the modules 108*a*, 108*b* supports communication over the bus 102 at the frequencies F1 and/or F2. In contrast, the module 110 supports communication over the bus 102 at the frequency F2. Note that the frequency F1 is higher than the frequency F2. Accordingly, communicating using the frequency F2 may be more bandwidth efficient than communicating using the frequency F1.

Accordingly, communication between any two modules, if both the modules support the first and second communication protocols 115, 117, is conducted in accordance with the first communication protocol 115 having the frequency F1. Accordingly, communication 120 between the modules 108*a* and 108*b* (where both the modules 108*a* and 108*b* support communication over the bus 102 at the frequencies F1 and/or F2) is performed in accordance with the first communication protocol 115 having the frequency F1.

However, communication between any two modules, if at least one of the two modules doesn't support the first communication protocol 115 having the frequency F1, is conducted in accordance with the second communication protocol 117 having the frequency F2. Accordingly, communication 124*a* between the modules 108*a* and 110 (where the module 110 supports communication over the bus 102 at the frequency F2 only) is performed in accordance with the second communication protocol 117 having the frequency F2. Similarly, communication 124*b* between the modules 108*b* and 110 is performed in accordance with the second communication protocol 117 having the frequency F2.

In FIG. 1, communication between two modules over the bus 102 using the frequency F1 is illustrated using a solid line, and communication between two modules over the bus 102 using the frequency F2 is illustrated using a dotted line. Accordingly, communication 120 between the modules 108*a* and 108*b* is illustrated using a solid line in FIG. 1; and communication 124*a* between the modules 108*a* and 110, and communication 124*b* between the modules 108*b* and 110 are illustrated using corresponding dotted lines in FIG. 1.

In one embodiment, the module 108*a* comprises a transceiver 130*a* for transmitting data to and/or from the bus 102 and/or the device 104*a*. For example, the transceiver 130*a* communicates data between the module 108*a* and the device 104*a*, and also between the module 108*a* and the bus 102. Similarly, the module 108*b* comprises a transceiver 130*b* for transmitting data to and/or from the bus 102 and/or the device 104*b*. In one embodiment, the module 108*a* comprises an encryption module 134*a* and a decryption module 136*a* for respectively encrypting and decrypting data. Similarly, the module 108*b* comprises an encryption module 134*b* and a decryption module 136*b* for respectively encrypting and decrypting data.

In one embodiment, the module 110 comprises a transceiver 130*c* for transmitting data to and/or from the bus 102 and/or the device 104*c*. However, unlike the modules 108*a* and 108*b*, the module 110 doesn't include an encryption module or a decryption module. Thus, the module 110 doesn't have encryption and/or decryption capabilities, in an example.

In one embodiment, data communicated at the frequency F1 over the bus 102 are encrypted prior to the communication over the bus 102 (e.g., by the encryption module 134 of the corresponding module 108). In contrast, unencrypted data are communicated at the frequency F2 over the bus 102. Accordingly, communication 120 of FIG. 1 is for encrypted data transmitted using the frequency F1, and communications 124*a*, 124*b* of FIG. 1 are for non-encrypted data transmitted using the frequency F2.

Figure 2:
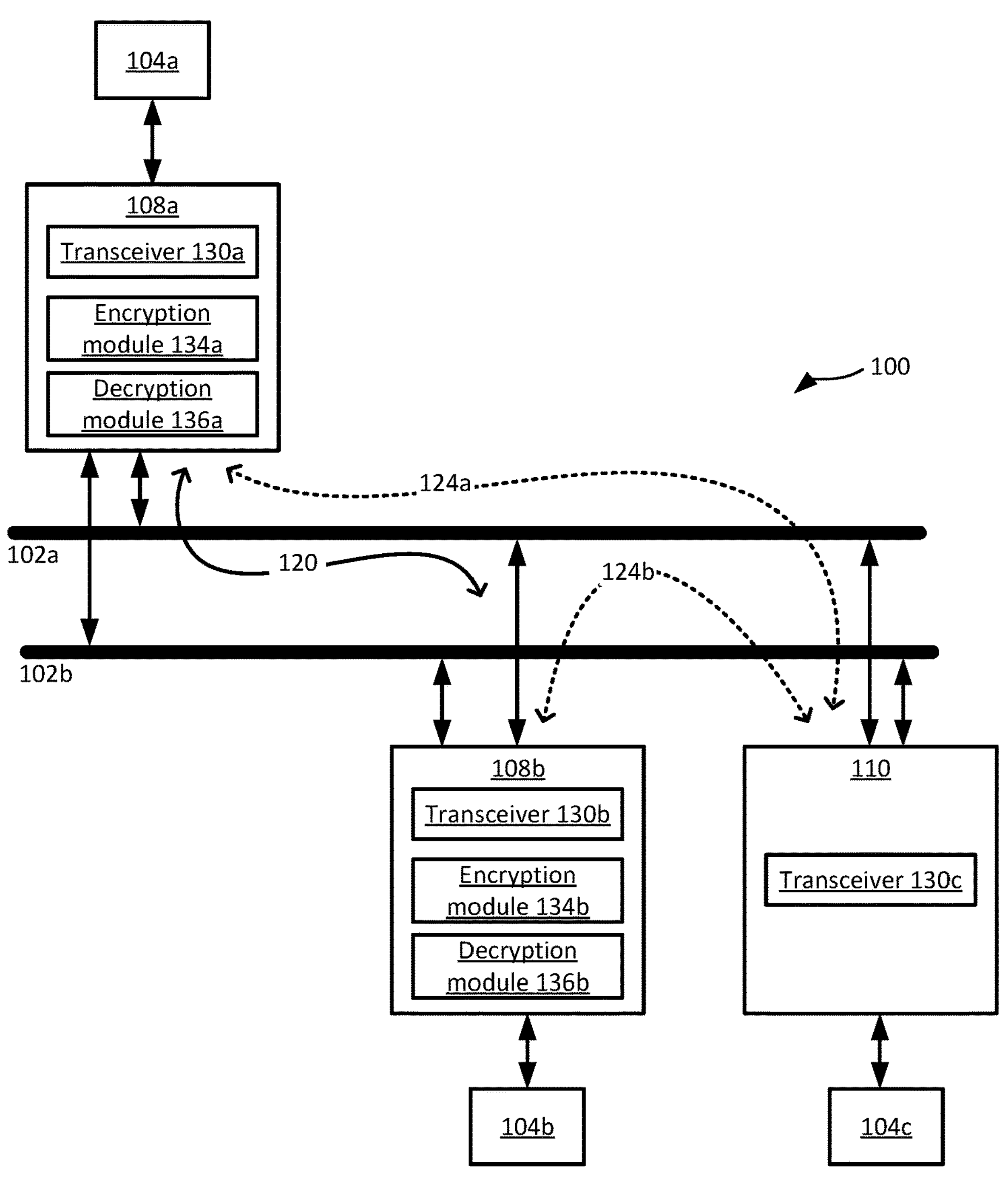
FIG. 2 illustrates the system of FIG. 1, with redundancy in the communication bus, in accordance with an embodiment of the present disclosure.

FIG. 2 illustrates the system 100 of FIG. 1, with redundancy in the communication bus 102, in accordance with an embodiment of the present disclosure. Thus, in FIG. 2, there are two lines 102*a*, 102*b* for communication between the various devices 104*a*, 104*b*, 104*c*. Although two lines are illustrated in FIG. 2, the bus 102 may have multiple redundant balanced line physical layers. At any given point in time, any one of the lines 102*a*, 102*b* are active and communicating data between the devices 104. In case one of the lines 102*a*, 102*b* fails for some reason, the other line is activated, which then communicates data between the devices 104. In one such example, the bus 102 is implemented in accordance with version B of MIL-STD-1553 and includes two redundant buses (102*a*, 102*b*).

Figure 3:
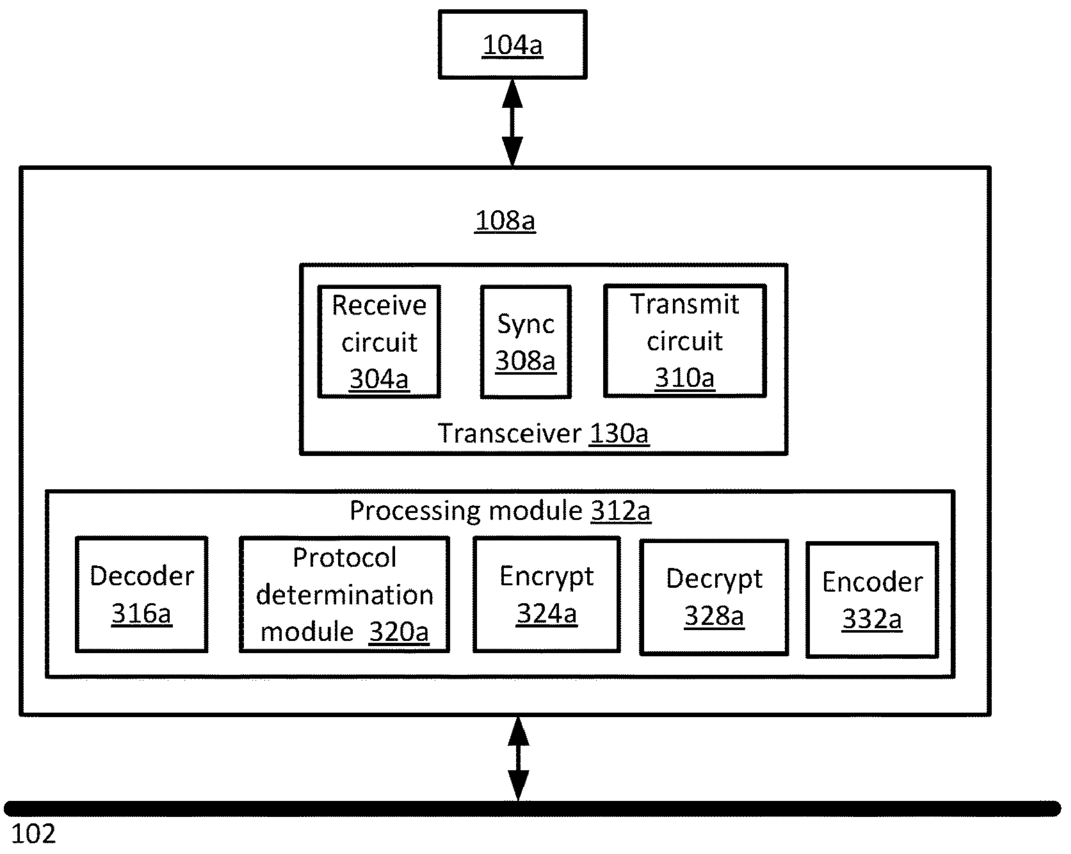
FIG. 3 illustrates the first (or second) module of FIG. 1 in further detail, in accordance with an embodiment of the present disclosure.

FIG. 3 illustrates the first module 108*a* of FIG. 1 in further detail, in accordance with an embodiment of the present disclosure. The module 108*b* is similar to the module 108*a*, and description of the module 108*a* also applies to the module 108*b*.

As illustrated, the module 108*a* includes the transceiver 130*a*, which includes a receive circuit 304*a* configured to receive data from the device 104*a* and/or the bus 102, a synchronization circuit 308*a*, and a transmit circuit 310*a* configured to transmit data to the device 104*a* and/or the bus 102. In an example, the synchronization circuit 308*a* ensures that all bits within a packet of received data and/or data to be transmitted are aligned to each other.

The module 108*a* also includes a processing module 312*a* to process data received by the module 108*a* and/or to be transmitted by the module 108*a*. In an example, the processing module 312*a* may be implemented using one or more processors, gate level arrays, circuits, an application specific integrated circuit (ASIC), field programmable gate arrays (FPGAs), a central processing unit (CPU), a graphics processing unit (GPU), and/or another appropriate type of processing units. In an example, the processing module 312*a* includes (i) a decoder 316*a* for decoding data received by the module 108*a*, (ii) a protocol determination module 320*a* for determining a communication protocol for transmitting data or a communication protocol of received data, (iii) an encrypt module 324*a* for selectively encrypting data to be transmitted from the module 108*a*, (iv) a decrypt module 328*a* for selectively decrypting data received by the module 108*a*, and (v) an encoder 332*a* for encoding data to be transmitted by the module 108*a*. In an example, one or more of these components may be stand-alone circuits, while in other examples these components may be implemented as a system-on-chip or chip set such as those described above (e.g., ASIC or FPGA), and functionality of these components are described below. In some such examples, module **108*a* is implemented as an FPGA that includes a logic block for each of encoding (332*a*), encrypting (324*a*), and transmitting (310*a*) on the transmit side, and a logic block for each of receiving (304*a*), synchronizing (308*a*), decoding 316*a*), and decrypting (328*a*) on the receive side. Such logic, as well as any logic that controls the communication between FPGAs, can be implemented in Verilog® or other hardware description language (HDL). In another example embodiment, module 108*a* is implemented as an FPGA as described above except that a first transceiver can be used to facilitate communication between the FPGA and the given device 104, and a second transceiver can be used to facilitate communication between the FPGA and the bus 102. The transceivers may be helpful for a number of reasons, in such an FPGA-based example. First, they can provide the transmitting (310*a*) and receiving (304*a***) functions. Second, the FPGA general-purpose inputs/outputs (GPIOs) may generate low voltage signals (e.g., 5 volts or less) which may be incompatible with the voltage levels required to drive the bus (e.g., the MIL-STD-1553B standard requires 18-27 volts to drive the bus). So, the transceivers can provide that voltage translation, or dedicated voltage translation circuits can be used. Third, the transmitter of a given transceiver converts encoded data, such Manchester II bi-phase data, to differential voltages suitable for driving an isolation transformer, while the receiver of a given transceiver converts the differential data for inputting to a Manchester II bi-phase decoder FPGA input pin.

Figure 4:
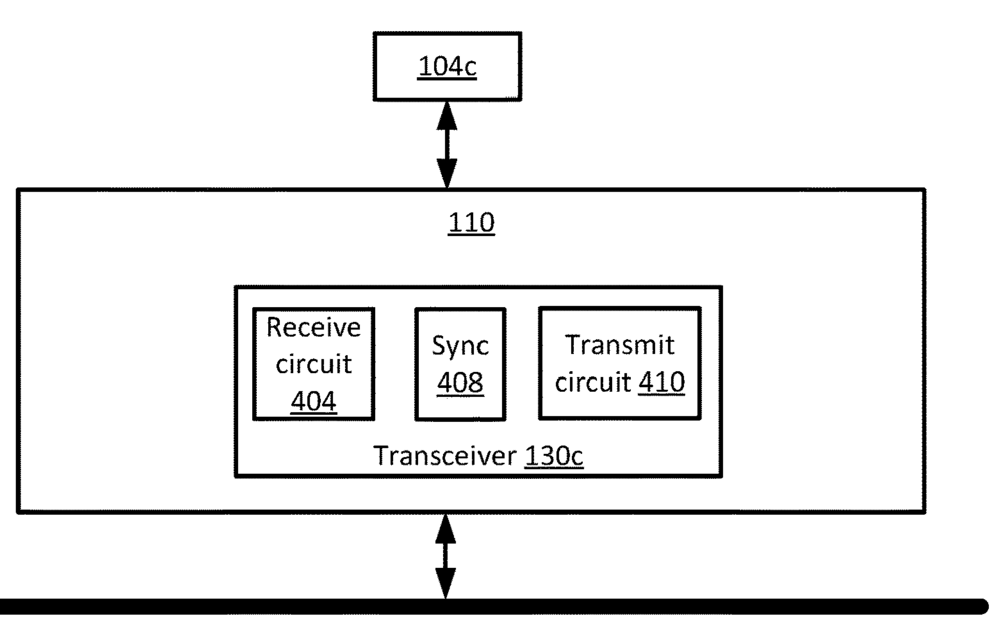
FIG. 4 illustrates the third module of FIG. 1 in further detail, in accordance with an embodiment of the present disclosure.

FIG. 4 illustrates the third module 110 of FIG. 1 in further detail, in accordance with an embodiment of the present disclosure. The module 110 communicatively couples the device **104*c* to the bus 102**.

As illustrated, the module 110 includes the transceiver **130*c*, which includes a receive circuit 404 configured to receive data from the device 104*c* and/or the bus 102, a synchronization circuit 408, and a transmit circuit 410 configured to transmit data to the device 104*c* and/or the bus 102. In an example, the synchronization circuit 408 ensures that all bits within a packet of received data and/or data to be transmitted are aligned to each other. Note that unlike the module 108*a* of FIG. 3, the module 110 of FIG. 4** lacks a processing module, a decoder, a protocol determination module, an encrypt module, a decrypt module, and/or an encoder.

Figure 5:
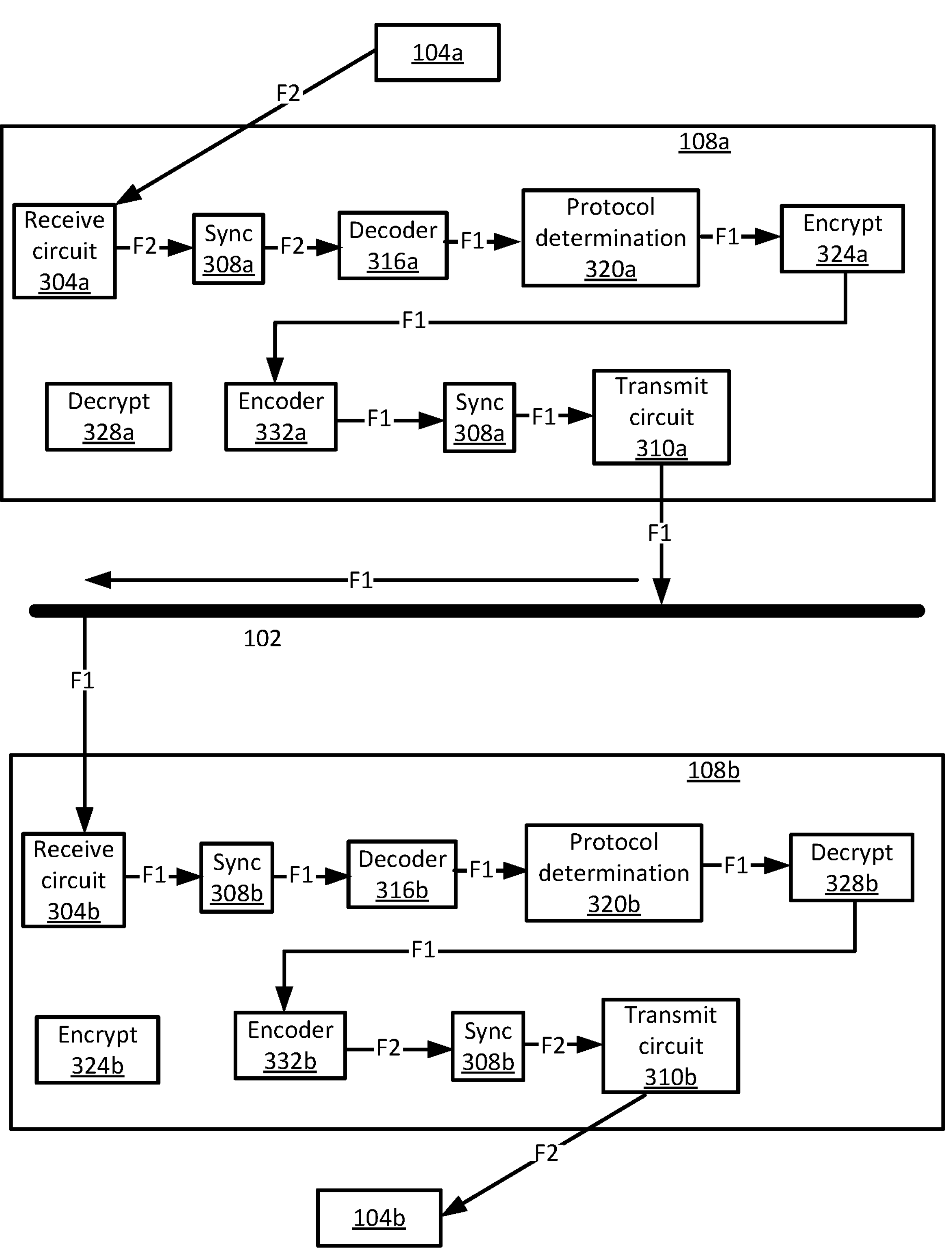
FIG. 5 illustrates communication, over the bus, from the first module to the second module of FIG. 1, wherein each of the first and second modules supports both encrypted communication in accordance with the first communication protocol (e.g., using frequency F1) and unencrypted communication in accordance with second communication protocol (e.g., using frequency F2), in accordance with an embodiment of the present disclosure.

FIG. 5 illustrates communication, over the bus 102, from the first module **108*a* to the second module 108*b* of FIG. 1, wherein each of the first and second modules supports both encrypted communication in accordance with the first communication protocol 115 (e.g., using frequency F1) and unencrypted communication in accordance with second communication protocol 117 (e.g., using frequency F2), in accordance with an embodiment of the present disclosure. As described above with respect to FIG. 1, the module 108*a* is communicatively coupled between the device 104*a* and the bus 102, and the module 108*b* is communicatively coupled between the device 104*b* and the bus 102. Thus, in FIG. 5, the communication is from the device 104*a* to the device 104*b***.

Note that in an example, the devices **104*a*, 104*b*, 104*c* may transmit and/or receive data from corresponding modules 108*a*, 108*b*, 110, respectively, using frequency F2. Accordingly, in FIG. 5, the device 104*a* transmits data to the receive circuit 304*a* of the transceiver 130*a* of the module 108*a* (also see FIG. 3**) at the above described frequency F2.

The synchronization module **308*a* synchronizes the data (e.g., the synchronization module 308*a* ensures that the bits within a chuck of received data are aligned to each other), and transmits the data to the decoder 316*a* of the processing module 312*a***.

The decoder **316*a* decodes the data, and transmits the data at frequency F1 to the protocol determination module 320*a*. Thus, the decoder 316*a* increases a frequency of the data from F2 to F1. For example, the decoder 316*a* receives the data at the frequency F1, and transmits the data to the protocol determination module 320*a*** at the frequency F1 that is higher than the frequency F2.

In an example, the decoder **316*a* is coupled to a memory (not illustrated in FIGS. 3 and 5), where the memory stores and/or buffers data received from the synchronization module 308*a* at the slower frequency of F2, and then decodes and transmits the data at the higher frequency F1 to the protocol determination module 320*a***.

The protocol determination module **320*a* decides on (i) whether the data is to be encrypted and eventually transmitted over the bus 102 in accordance with the communication protocol 115 and having frequency F1, or (ii) whether the data is not to be encrypted and eventually transmitted over the bus 102 in accordance with the communication protocol 117** and having frequency F2.

For example, if the destination address of the data is the device **104*b* and/or the corresponding module 108*b*, then the module 108*a* (such as the protocol determination module 320*a*) knows that the data is to be transmitted to a module 108*b* that supports both the communication protocols 115 and 117, and hence, data can be transmitted in accordance with the communication protocol 115. On the other hand, if the destination address of the data is the device 104*c* and/or the corresponding module 110, then the module 108*a* (such as the protocol determination module 320*a*) knows that the data is to be transmitted to a module 110 that supports the communication protocol 117 (and not the communication protocol 115), and hence, data has to be transmitted in accordance with the communication protocol 117 to the module 110**.

Accordingly, in an example, the protocol determination module **320*a* parses the data, to determine the destination address of the data, which may be one of the modules 108*b* or 110 in the example of FIG. 1. Based on the destination address of the data, the decision module 320*a* decides on (i) whether the data is to be encrypted and eventually transmitted over the bus 102 in accordance with the communication protocol 115 and having frequency F1, or (ii) whether the data is not to be encrypted and eventually transmitted over the bus 102 in accordance with the communication protocol 117** and having frequency F2.

In the example of FIG. 5, the destination address of the data is the device **104*b* and/or the corresponding module 108*b*. Accordingly, the protocol determination module 320*a* decides that the data is to be encrypted and eventually transmitted over the bus 102 in accordance with the communication protocol 115 and having frequency F1. Accordingly, in FIG. 5, the data is encrypted by the encryption module 324*a*, and encoded by the encoder 332*a*, as illustrated in FIG. 5. Transmission from the protocol determination module 320*a* to the encryption module 324*a*, and then to the encoder 332*a* is at the frequency F1. The encrypted and encoded data is transmitted to the synchronization module 308*a* for synchronization, and then the transmit circuit 310*a* transmits the synchronized, encrypted, and encoded data over the bus 102 at frequency F1 (e.g., using the communication protocol 115**).

The module **108*b* receives the data from the bus 102, where the data is being transmitted over the bus 102 in accordance with the communication protocol 115 and at the frequency F1. The data is received at the receive circuit 304***b* of the module 108*b*, synchronized by the synchronization circuit 308*b*, and decoded by the decoder 316*b*. The output of the decoder 316*b* is still at the frequency of F1, and is received by the protocol determination module 320*b*. The protocol determination module 320*b* parses the data, and determines whether the data is at the frequency F1 or F2 and/or determines whether the data is encrypted or unencrypted.

In an example, the protocol determination module 320*a* parses a source address of the received data. As the source address of the received data is the device 104*a* and/or the module 108*a* that supports both the communication protocols 115 and 117, the protocol determination module 320*b* determines that the data is transmitted from the module 108*a* to the module 108*b* using the communication protocol 115 and at frequency F1 (e.g., the received data is at the frequency F1, and is encrypted). Accordingly, a decryption module 328*b* decrypts the data, and the decrypted data is encoded by an encoder 332*b*. The encoder 332*b* lowers the frequency of the data from F1 to F2 (e.g., as the device 104*b* may receive data from the module 108*b* at frequency F2). In an example, the encoder 332*b* is coupled to a memory (not illustrated in FIG. 5), where the memory stores and/or buffers data received from the decryption module 328*b* at the higher frequency F1, and which is then encoded at the lower frequency F2. The encoded data is transmitted to the device 104*b*, through the transmit circuit 310*b*.

Figure 6:
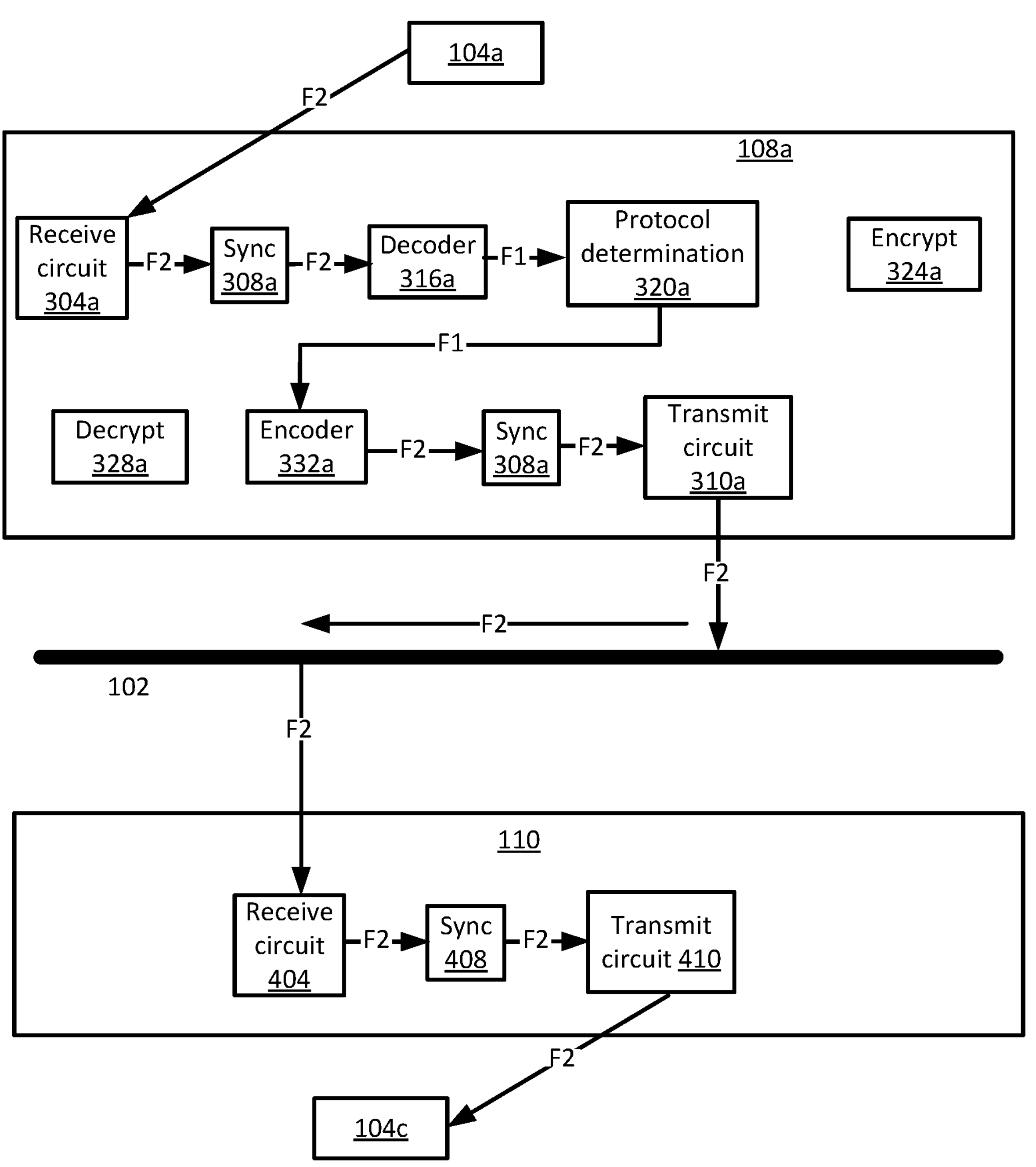
FIG. 6 illustrates communication over the bus from the first module to the third module of FIG. 1, wherein the first module supports both encrypted communication in accordance with the first communication protocol (e.g., using frequency F1) and unencrypted communication in accordance with second communication protocol (e.g., using frequency F2), and wherein the third module supports unencrypted communication in accordance with second communication protocol (e.g., using frequency F2), in accordance with an embodiment of the present disclosure.

FIG. 6 illustrates communication over the bus 102 from the first module 108*a* to the third module 110 of FIG. 1, wherein the first module 108*a* supports both encrypted communication in accordance with the first communication protocol 115 (e.g., using frequency F1) and unencrypted communication in accordance with second communication protocol 117 (e.g., using frequency F2), and wherein the third module 110 supports unencrypted communication in accordance with second communication protocol 117 (e.g., using frequency F2), in accordance with an embodiment of the present disclosure. As described above with respect to FIG. 1, the module 108*a* is communicatively coupled between the device 104*a* and the bus 102, and the module 110 is communicatively coupled between the device 104*c* and the bus 102. Thus, in FIG. 6, the communication is from the device 104*a* to the device 104*c*.

Because the module 110 doesn't support encrypted communication in accordance with the first communication protocol 115 using the frequency F1, the module 108*a* transmits to the module 110 in accordance with the second communication protocol 117 and using the frequency F2, as illustrated in FIG. 6.

The device 104*a* transmits data to the receive circuit 304*a* of the transceiver 130*a* of the module 108*a* (also see FIG. 3) at the above described frequency F2, as illustrated in FIG. 6. The synchronization module 308*a* synchronizes the data (e.g., the synchronization module 308*a* ensures that the bits within a chuck of received data are aligned to each other), and transmits the data to the decoder 316*a* of the processing module 312*a*.

The decoder 316*a* decodes the data, and transmits the data at frequency F1 to the protocol determination module 320*a*. Thus, the decoder 316*a* increases a frequency of the data from F2 to F1, and transmits the data to the protocol determination module 320*a* at the frequency F1 that is higher than the frequency F2. In an example, the decoder 316*a* is coupled to a memory (not illustrated in FIGS. 3 and 5), where the memory stores and/or buffers data received from the synchronization module 308*a* at the lower frequency of F2, and then decodes and transmits the data at the higher frequency F1.

The protocol determination module 320*a* decides on (i) whether the data is to be encrypted and eventually transmitted over the bus 102 in accordance with the communication protocol 115 and having frequency F1, or (ii) whether the data is not to be encrypted and eventually transmitted over the bus 102 in accordance with the communication protocol 117 and having frequency F2. As described above, the decision module 320*a* parses the data, to determine a destination address of the data, which is the device 104*c* and/or the corresponding module 110 in the example of FIG. 6. Based on the destination address of the data, the protocol determination module 320*a* decides that the data is not to be encrypted and transmitted over the bus 102 in accordance with the communication protocol 117 with frequency F2.

Accordingly, in FIG. 6, the data is not encrypted by the encryption module 324*a*. The unencrypted data is encoded by the encoder 332*a*, as illustrated in FIG. 6. In an example, the encoder 332*a* receives the data at a frequency of F1, and outputs the encoded data at a frequency of F2. Note that a memory (not illustrated in FIG. 6) may be coupled to the encoder 332*a*, where the data may be saved or buffered in the memory, while the encoder 332*a* receives the data at the higher frequency F1 and outputs encoded data at the lower frequency F2. The encoded (and unencrypted) data is transmitted to the synchronization module 308*a* for synchronization, and then the transmit circuit 310*a* transmits the synchronized, unencrypted, and encoded data over the bus 102 at frequency F2 (e.g., using the communication protocol 117).

The module 110 receives the data from the bus 102, where the data is being transmitted over the bus 102 in accordance with the communication protocol 117 and at the frequency F2. The data is received at the receive circuit 404 of the module 110, synchronized by the synchronization circuit 408, and transmitted to the device 104*c* through the transmit circuit 410, at the frequency F2. Because the data received from the bus 102 by the module 110 is not encrypted by the module 108*a*, the data need not be decoded, decrypted, and/or encoded by the module 110.

Figure 7:
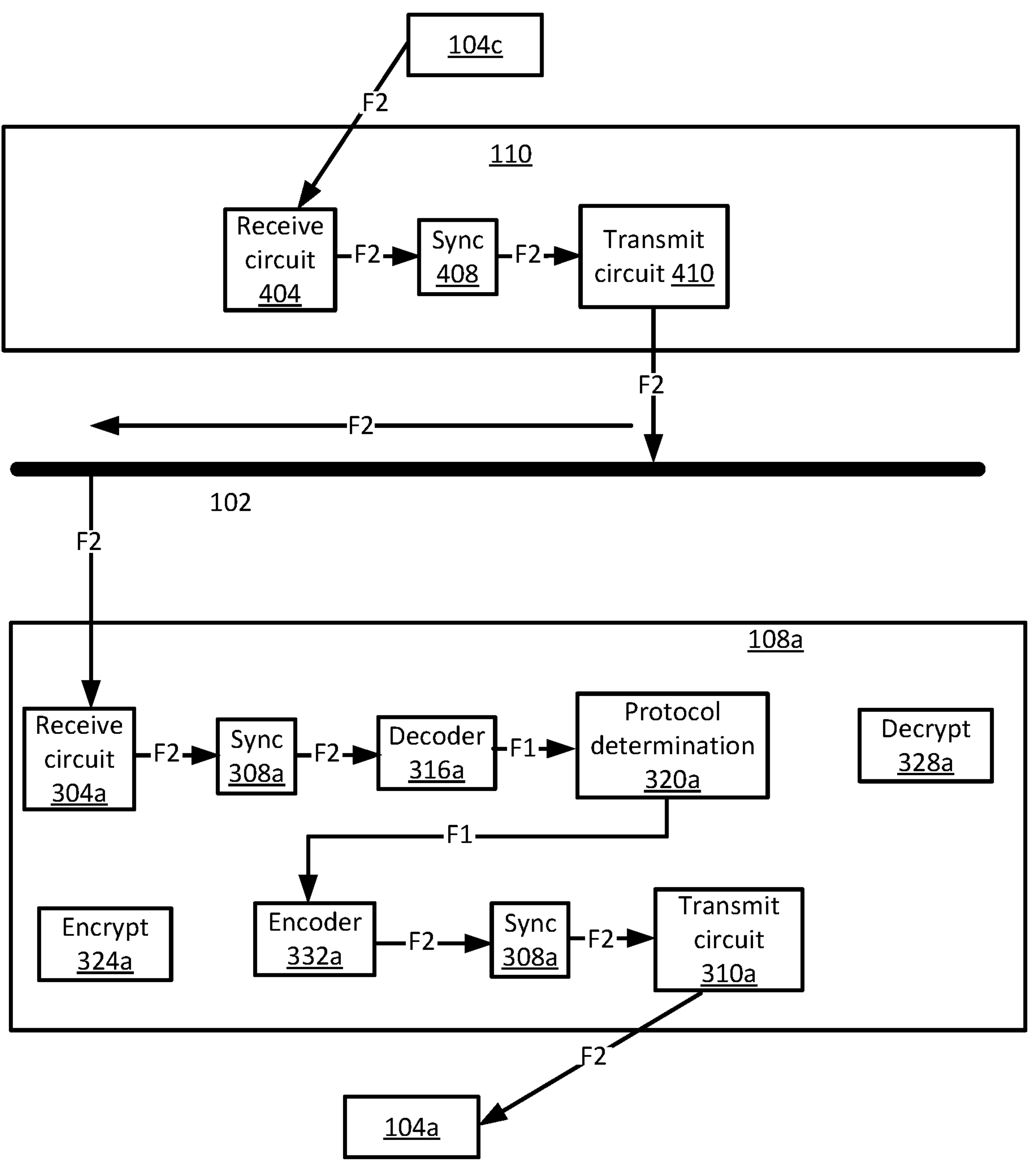
FIG. 7 illustrates communication over the bus from the third module to the first module of FIG. 1, wherein the third module only supports unencrypted communication in accordance with second communication protocol (e.g., using frequency F2), and wherein the first module supports both encrypted communication in accordance with the first communication protocol (e.g., using frequency F1) and unencrypted communication in accordance with second communication protocol (e.g., using frequency F2), in accordance with an embodiment of the present disclosure.

FIG. 7 illustrates communication over the bus 102 from the third module 110 to a first module 108*a* of FIG. 1, wherein the third module 110 only supports unencrypted communication in accordance with second communication protocol 117 (e.g., using frequency F2), and wherein the first module 108*a* supports both encrypted communication in accordance with the first communication protocol 115 (e.g., using frequency F1) and unencrypted communication in accordance with second communication protocol 117 (e.g., using frequency F2), in accordance with an embodiment of the present disclosure. As described above with respect to FIG. 1, the module 108*a* is communicatively coupled between the device 104*a* and the bus 102, and the module 110 is communicatively coupled between the device 104*c* and the bus 102. Thus, in FIG. 6, the communication is from the device 104*c* to the device 104*a*.

Because the module 110 doesn't support encrypted communication in accordance with the first communication protocol 115 with the frequency F1, the module 110 transmits to the module 108*a* in accordance with the second communication protocol 117 and with the frequency F2, as illustrated in FIG. 7.

The device 104*c* transmits data to the receive circuit 404 of the transceiver 130*c* of the module 110 (also see FIG. 4) at frequency F2, as illustrated in FIG. 7. The synchronization module 408 synchronizes the data, and transmits the data to the transmit circuit 410, which then transmits the data to the bus 102 at frequency F2. Because the data transmitted to the bus 102 by the module 110 is not encrypted, the data need not be decoded, encrypted, and/or encoded by the module 110, in an example.

The receive circuit 304*a* of the module 108*a* receives the unencrypted data from bus 102 at the frequency F2. The data is synchronized by the synchronization circuit 308*a*, and decoded by the decoder 316*a*. The output of the decoder 316*a* is at the frequency F1, and is received by the protocol determination module 320*a*. The protocol determination module 320*a* parses the data, and determines whether the data received over the bus 102 was at the frequency F1 or F2, and/or determines whether the data is encrypted or unencrypted. In an example, the protocol determination module 320*a* determines that a source address of the data is module 110, and the protocol determination module 320*a* knows that the module 110 can only transmit data in accordance with the frequency F2. Accordingly, the protocol determination module 320*a* determines that the data is unencrypted and transmitted at the frequency F2.

Accordingly, no decryption of the data is performed. The encoder 332*a* lowers the frequency of the data from F1 to F2. In an example, the encoder 332*a* is coupled to a memory (not illustrated in FIG. 7), where the memory stores and/or buffers data received by the encryption module 332*a* at the higher frequency F1, and then encoded at the lower frequency F2. The encoded data is transmitted to the device 104*c* through the transmit circuit 310*c*.

Figure 8:
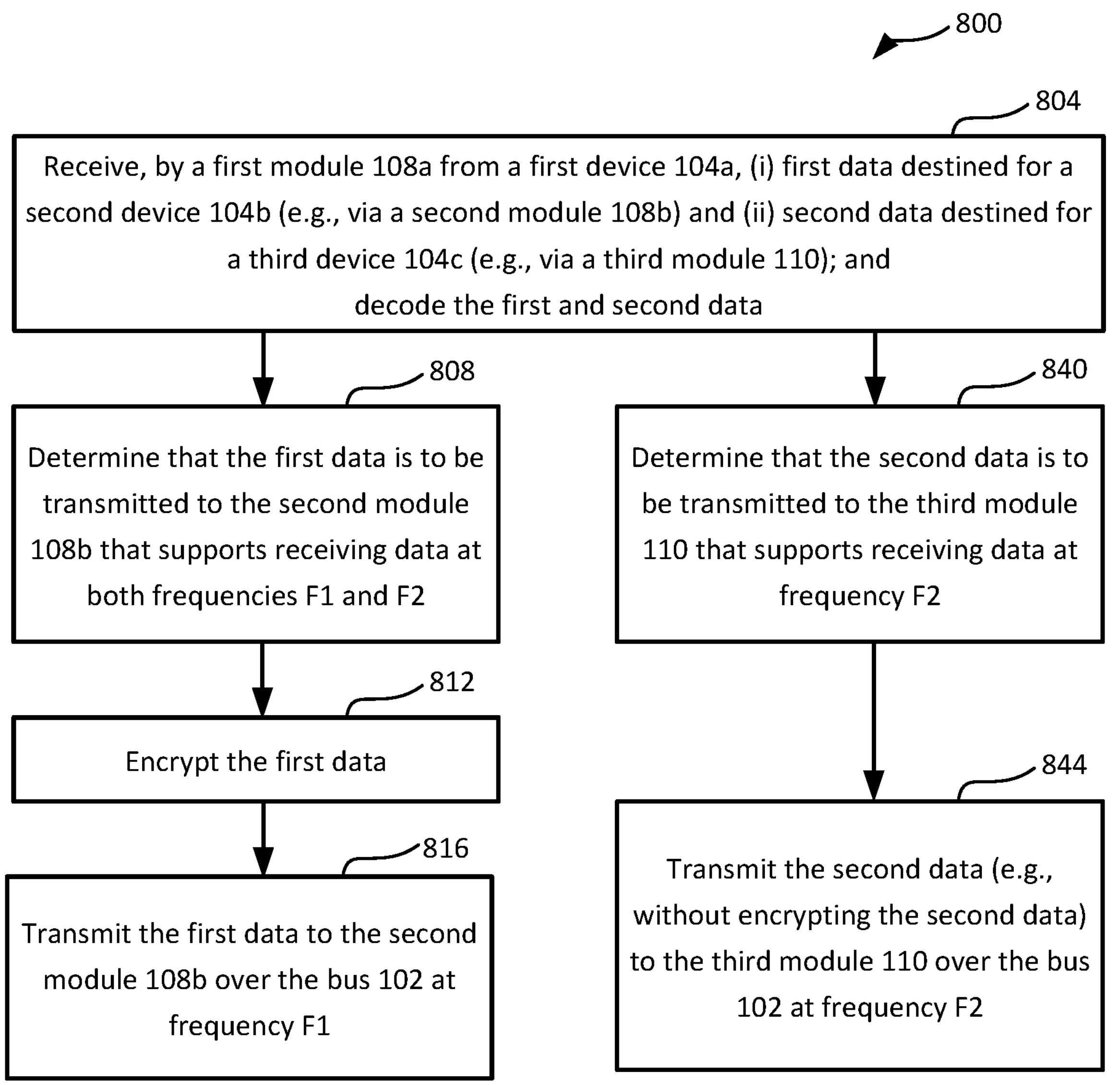
FIG. 8 illustrate a flowchart depicting a method of transmitting data by a first module that supports both encrypted communication in accordance with a first communication protocol (e.g., using frequency F1) and unencrypted communication in accordance with a second communication protocol (e.g., using frequency F2), in accordance with an embodiment of the present disclosure.

FIG. 8 illustrate a flowchart depicting a method 800 of transmitting data by a first module 108*a* that supports both encrypted communication in accordance with the first communication protocol 115 (e.g., using frequency F1) and unencrypted communication in accordance with the second communication protocol 117 (e.g., using frequency F2), in accordance with an embodiment of the present disclosure.

At 804 of method 800, the first module 108*a* receives from first device 104*a* (i) first data destined for a second device 104*b* (e.g., via a second module 108*b*, e.g., see FIG. 5) and (ii) second data destined for a third device 104*c* (e.g., via a third module 110, e.g., see FIG. 6). Also at 804, the first module 108*a* (e.g., the decoder 316*a*) decodes the first and second data, as described above with respect to FIGS. 5 and 6. In an example, the first data and the second data may be received at least in part simultaneously, and/or at any order by the first module 108*a* from the first device 104*a*.

The method 800 proceeds from 804 to 808 where the first data is processed, and also proceeds from 804 to 840 where the second data is processed. At 808, the first module 108*a* (e.g., the protocol determination 320*a*) determines that the first data is to be transmitted to the second module 108*b* that supports receiving data at both frequencies F1 and F2, e.g., as described above with respect to FIG. 5. Accordingly, as also described above with respect to FIG. 5, the first data is to be encrypted and transmitted in accordance with the communication protocol 115 at frequency F1.

The method 800 proceeds from 808 to 812, where the first data is encrypted (e.g., by the encryption module 324*a*). The method 800 proceeds from 812 to 816, where the first data is transmitted to the second module 108*b* over the bus 102 at frequency F1, e.g., using the communication protocol 115, as described above with respect to FIG. 5.

The method also proceeds from 804 to 840. At 840, the first module 108*a* (e.g., the protocol determination 320*a*) determines that the second data is to be transmitted to the third module 110 that supports receiving data at frequency F2 (and not at frequency F1). Accordingly, as also described above with respect to FIG. 6, the second data is to be not encrypted and transmitted in accordance with the communication protocol 117 at frequency F2.

The method 800 proceeds from 840 to 844, where the second data is transmitted (e.g., without encrypting the second data) to the third module 110 over the bus 102 at frequency F2, e.g., using the communication protocol 117, as described above with respect to FIG. 6.

Note that the processes in method 800 are shown in a particular order for case of description. However, one or more of the processes may be performed in a different order or may not be performed at all (and thus be optional), in accordance with some embodiments. For example, the processes 808, 812, 816 may be performed prior to, at least in part simultaneously, or subsequent to the processes 840, 844. Numerous variations on method 800 and the techniques described herein will be apparent in light of this disclosure.

Figure 9:
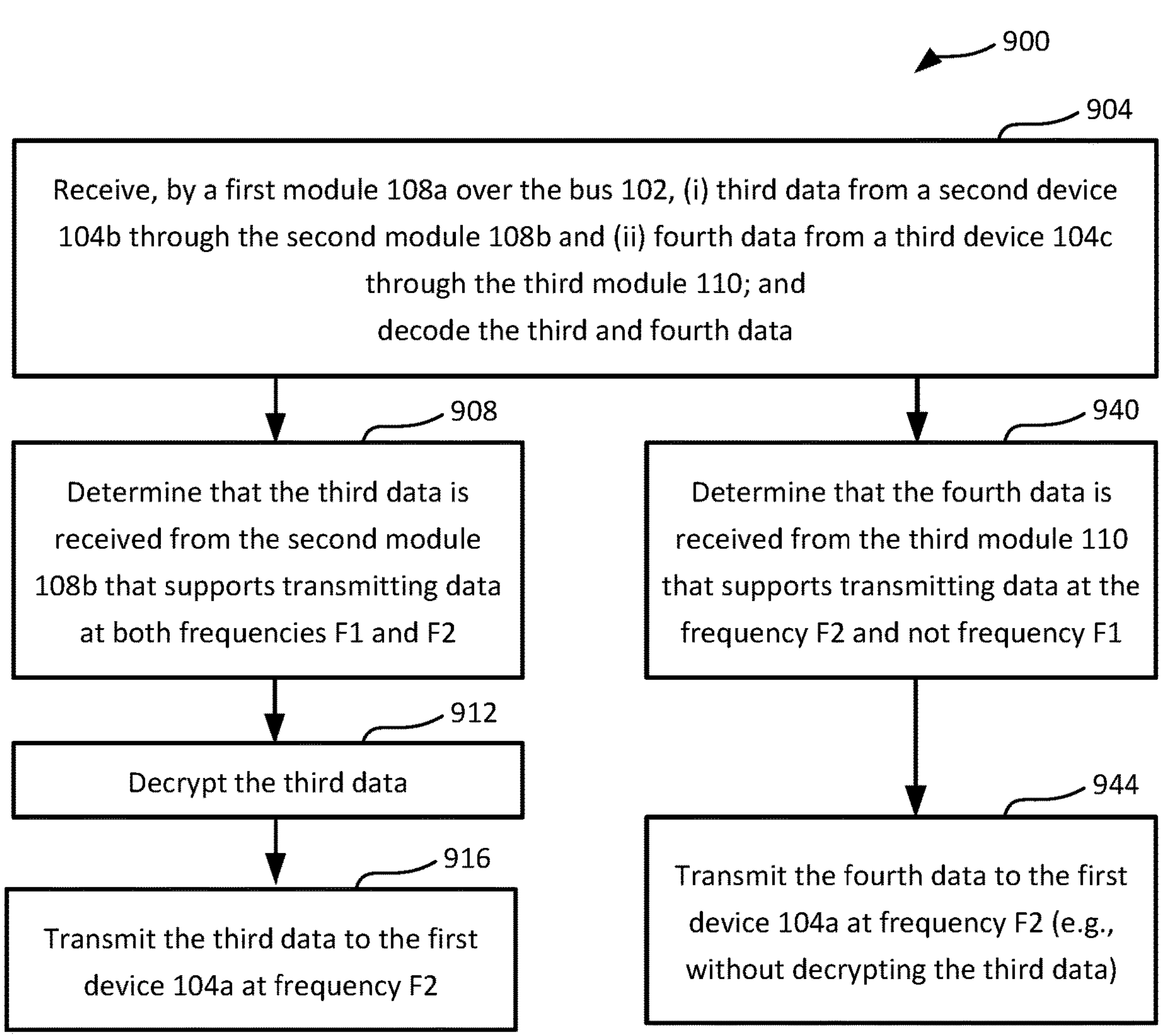
FIG. 9 illustrate a flowchart depicting a method of receiving data by a first module that supports both encrypted communication in accordance with the first communication protocol (e.g., using frequency F1) and unencrypted communication in accordance with the second communication protocol (e.g., using frequency F2), in accordance with an embodiment of the present disclosure.

FIG. 9 illustrate a flowchart depicting a method 900 of receiving data by a first module 108*a* that supports both encrypted communication in accordance with the first communication protocol 115 (e.g., using frequency F1) and unencrypted communication in accordance with the second communication protocol 117 (e.g., using frequency F2), in accordance with an embodiment of the present disclosure.

At 904 of method 900, the first module 108*a* receives over the bus 102 (*i*) third data from a second device 104*b* and through the second module 108*b* (e.g., FIG. 5 describes the opposite scenario of the second module 108*b* receiving data from the first module 108*a*) and (ii) fourth data from a third device 104*c* and through the third module 110 (e.g., see FIG. 7). Also at 904, the first module 108*a* (e.g., the decoder 316*a*) decodes the third and fourth data, as described above with respect to FIGS. 5 and 7. In an example, the third data and the fourth data may be received at least in part simultaneously, and/or at any order by the first module 108*a*.

The method 900 proceeds from 904 to 908 where the third data is processed, and also proceeds from 904 to 940 where the fourth data is processed. At 908, the first module 108*a* (e.g., the protocol determination 320*a*) determines that the third data is received from the second module 108*b* that supports transmitting data at both frequencies F1 and F2, e.g., as described above with respect to FIG. 5. Accordingly, as also described above with respect to FIG. 5, the third data is encrypted data received at frequency F1, and has to be decrypted.

The method 900 proceeds from 908 to 912, where the third data is decrypted (e.g., by the decryption module 328*a*). The method 900 proceeds from 912 to 916, where the third data is transmitted to the first device 104*a* at frequency F2, e.g., as described above with respect to FIG. 5.

The method also proceeds from 904 to 940. At 940, the first module 108*a* (e.g., the protocol determination 320*a*) determines that the fourth data is received from the third module 110 that supports transmitting data at the frequency F2 and not frequency F1. Accordingly, as also described above with respect to FIG. 7, the third data is unencrypted data transmitted over the bus 102 in accordance with the communication protocol 117 at frequency F2. The method 900 proceeds from 940 to 944, where the fourth data is transmitted (e.g., without decrypting the fourth data) to the first device 104*a* at frequency F2, as described above with respect to FIG. 7.

Note that the processes in method 900 are shown in a particular order for case of description. However, one or more of the processes may be performed in a different order or may not be performed at all (and thus be optional), in accordance with some embodiments. For example, the processes 908, 912, 916 may be performed prior to, at least in part simultaneously, or subsequent to the processes 940, 944. Numerous variations on method 900 and the techniques described herein will be apparent in light of this disclosure.

Further Example Examples

The following examples pertain to further examples, from which numerous permutations and configurations will be apparent.

Example 1. An apparatus comprising: a first module configured to communicatively couple a first device to a communication bus; wherein the first module is configured to transmit, over the bus, first data at a first frequency to a second module that is communicatively coupled to a second device; wherein the first module is configured to transmit, over the bus, second data at a second frequency to a third module that is communicatively coupled to a third device; and wherein the first frequency is different from the second frequency.

Example 2. The apparatus of example 1, wherein the first data transmitted by the first module to the second module is encrypted by the first module.

Example 3. The apparatus of any one of examples 1-2, wherein the second data transmitted by the first module to the third module is not encrypted by the first module.

Example 4. The apparatus of any one of examples 1-3, wherein the first frequency is more than 10 MHz, and the second frequency is less than 5 MHz.

Example 5. The apparatus of any one of examples 1-4, wherein the first frequency is 15 MHz, and the second frequency is 1 MHz.

Example 6. The apparatus of any one of examples 1-5, wherein the first module comprises: a transceiver configured to receive the first data at the second frequency from the first device; a decoder configured to receive the first data from the transceiver at the second frequency, and decode the first data at the first frequency; and an encoder configured to receive the first data at the first frequency, as decoded by the decoder, and encode the first data at the first frequency; wherein the transceiver is configured to transmit the first data, as encoded by the encoder, to the bus at the first frequency.

Example 7. The apparatus of example 1, wherein the first module comprises: a transceiver configured to receive the second data at the second frequency from the first device; a decoder configured to receive the second data from the transceiver at the second frequency, and decode the second data at the first frequency; and an encoder configured to receive the second data at the first frequency, as decoded by the decoder, and encode the second data at the second frequency; wherein the transceiver is configured to transmit the second data, as encoded by the encoder, to the bus at the second frequency.

Example 8. The apparatus of any one of examples 1-7, wherein the first module comprises an encryption module configured to encrypt the first data, prior to transmission of the first data from the first module to the second module over the bus, wherein the encryption module refrains from encrypting the second data, prior to transmission of the second data from the first module to the third module over the bus.

Example 9. The apparatus of example 1, wherein the first module comprises: a transceiver configured to receive the first data and the second data from the first device; and a protocol determination module configured to determine a first destination address of the first data and a second destination address of the second data; wherein the transceiver is further configured to transmit the first data at the first frequency to the second module, in response to a determination that the second module associated with the first destination address supports receiving data at both the first and second frequencies; and wherein the transceiver is further configured to transmit the second data at the second frequency to the third module, in response to a determination that the third module associated with the second destination address supports receiving data at the second frequency and not the first frequency.

Example 10. The apparatus of any one of examples 1-9, wherein: the first module is configured to receive third data from the second module and over the bus at the first frequency; and the first module is configured to receive fourth data from the third module and over the bus at the second frequency.

Example 11. The apparatus of any one of examples 1-10, wherein the third device is configured to communicate with any other device of the plurality of devices at the second frequency, and is incapable of communicating or processing data at the first frequency.

Example 12. The apparatus of any one of examples 1-11, wherein the bus is a military standard MIL-STD-1553 bus.

Example 13. A system comprising: a bus for communication between a plurality of devices; and a first module configured to communicatively couple a first device of the plurality of devices and the bus, a second module configured to communicatively couple a second device of the plurality of devices and the bus, and a third module configured to communicatively couple a third device of the plurality of devices and the bus; wherein the first module is configured to transmit first data to the second module in accordance with a first communication protocol and over the bus; and wherein the first module is configured to transmit second data to the third module in accordance with a second communication protocol and over the bus.

Example 14. The system of example 13, wherein communication in accordance with the first communication protocol is at a first frequency that is greater than 10 MHz, and communication in accordance with the second communication protocol is at a second frequency that is less than 5 MHz.

Example 15. The system of any one of examples 13-14, wherein the first data transmitted by the first module to the second module is encrypted by the first module, and the second data transmitted by the first module to the third module is not encrypted by the first module.

Example 16. The system of any one of examples 13-15, wherein the bus is a military standard MIL-STD-1553 bus.

Example 17. The system of any one of examples 13-16, wherein the first device is one of a remote terminal or a bus controller, and at least one of the second or third devices is the other of the remote terminal or the bus controller.

Example 18. A method comprising: receiving, by a first module from a first device, first data and second data; determining that the first data is to be transmitted to the second module that supports receiving data at both a lower frequency and a higher frequency; determining that the second data is to be transmitted to the third module that supports receiving data at the lower frequency and not the higher frequency; transmitting the first data at the higher frequency to the second module over a bus; and transmitting the second data at the lower frequency to the third module over the bus.

Example 19. The method of example 18, further comprising: encrypting, within the first module, the first data, prior to transmitting the first data to the second module over the bus; and refraining from encrypting, within the first module, the second data, prior to transmitting the second data to the third module over the bus.

Example 20. The method of any one of examples 18-19, further comprising: receiving, by the first module and over the bus, third data from the second module and fourth data from the third module; and determining (i) that the third data is received from the second module that supports transmitting data at both the lower frequency and the higher frequency, and (ii) that the fourth data is received from the third module that supports transmitting data at the lower frequency; decrypting the third data, and subsequently transmitting the third data to the first device; and transmitting the fourth data to the first device, without decrypting the fourth data.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the antenna system 100.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An apparatus comprising:

a first module configured to communicatively couple a first device to a communication bus;

wherein the first module is configured to transmit, over the bus, first data at a first frequency to a second module that is communicatively coupled to a second device, wherein the second module comprises a transceiver;

wherein the first module is configured to transmit, over the bus, second data at a second frequency to a third module that is communicatively coupled to a third device, wherein the third module comprises a transceiver; and wherein the first frequency is different from the second frequency;

wherein the first module comprises:

a transceiver configured to receive the first data and the second data from the first device; and a protocol determination module configured to determine a first destination address of the first data and a second destination address of the second data;

wherein the transceiver is further configured to transmit the first data at the first frequency to the second module, in response to a determination that the second module associated with the first destination address supports receiving data at both the first and second frequencies; and wherein the transceiver is further configured to transmit the second data at the second frequency to the third module, in response to a determination that the third module associated with the second destination address supports receiving data at the second frequency and not the first frequency.

2. The apparatus of claim 1, wherein the first data transmitted by the first module to the second module is encrypted by the first module.

3. The apparatus of claim 1, wherein the second data transmitted by the first module to the third module is not encrypted by the first module.

4. The apparatus of claim 1, wherein the first frequency is more than 10 MHz, and the second frequency is less than 5 MHz.

5. The apparatus of claim 1, wherein the first frequency is 15 MHz, and the second frequency is 1 MHz.

6. The apparatus of claim 1, wherein the first module comprises:

a transceiver configured to receive the first data at the second frequency from the first device;

a decoder configured to receive the first data from the transceiver at the second frequency, and decode the first data at the first frequency; and an encoder configured to receive the first data at the first frequency, as decoded by the decoder, and encode the first data at the first frequency;

wherein the transceiver is configured to transmit the first data, as encoded by the encoder, to the bus at the first frequency.

7. The apparatus of claim 1, wherein the first module comprises:

a transceiver configured to receive the second data at the second frequency from the first device;

a decoder configured to receive the second data from the transceiver at the second frequency, and decode the second data at the first frequency; and an encoder configured to receive the second data at the first frequency, as decoded by the decoder, and encode the second data at the second frequency;

wherein the transceiver is configured to transmit the second data, as encoded by the encoder, to the bus at the second frequency.

8. The apparatus of claim 1, wherein the first module comprises:

an encryption module configured to encrypt the first data, prior to transmission of the first data from the first module to the second module over the bus, wherein the encryption module refrains from encrypting the second data, prior to transmission of the second data from the first module to the third module over the bus.

9. The apparatus of claim 1, wherein:

the first module is configured to receive third data from the second module and over the bus at the first frequency; and the first module is configured to receive fourth data from the third module and over the bus at the second frequency.

10. The apparatus of claim 1, wherein the third device is configured to communicate with any other device of the plurality of devices at the second frequency, and is incapable of communicating or processing data at the first frequency.

11. The apparatus of claim 1, wherein the bus is a military standard MIL-STD-1553 bus.

12. A system comprising:

a bus for communication between a plurality of devices; and a first module configured to communicatively couple a first device of the plurality of devices and the bus, a second module, comprising a transceiver and configured to communicatively couple a second device of the plurality of devices and the bus, and a third module, comprising a transceiver and configured to communicatively couple a third device of the plurality of devices and the bus, wherein the first module comprises a transceiver configured to receive first data and second data from the first device, and a protocol determination module configured to determine a first destination address of the first data and a second destination address of the second data;

wherein the transceiver is further configured to transmit the first data at a first frequency to the second module in accordance with a first communication protocol and over the bus, in response to a determination that the second module associated with the first destination address supports receiving data at both the first frequency and a second frequency; and wherein the transceiver is further configured to transmit the second data at a second frequency to the third module in accordance with a second communication protocol and over the bus, in response to a determination that the third module associated with the second destination address supports receiving data at the second frequency and not the first frequency.

13. The system of claim 12, wherein communication in accordance with the first communication protocol is at a first frequency that is greater than 10 MHz, and communication in accordance with the second communication protocol is at a second frequency that is less than 5 MHz.

14. The system of claim 12, wherein the first data transmitted by the first module to the second module is encrypted by the first module, and the second data transmitted by the first module to the third module is not encrypted by the first module.

15. The system of claim 12, wherein the bus is a military standard MIL-STD-1553 bus.

16. The system of claim 12, wherein the first device is one of a remote terminal or a bus controller, and at least one of the second or third devices is the other of the remote terminal or the bus controller.

17. A method comprising:

receiving, by a transceiver of a first module from a first device, first data and second data;

determining, by a protocol determination module of the first module, a first destination address of the first data and a second destination address of the second data;

determining that the first data is to be transmitted to the second module associated with the first destination address supports receiving data at both a lower frequency and a higher frequency, wherein the second module comprises a transceiver;

determining that the second data is to be transmitted to the third module associated with the second destination address supports receiving data at the lower frequency and not the higher frequency, wherein the third module comprises a transceiver;

transmitting, by the transceiver of the first module, the first data at the higher frequency to the second module over a bus, in response to the determination that the second module associated with the first destination address supports receiving data at both the lower frequency and the higher frequency; and transmitting, by the transceiver of the first module, the second data at the lower frequency to the third module over the bus, in response to the determination that the third module associated with the second destination address supports receiving data at the lower frequency and not the higher frequency.

18. The method of claim 17, further comprising:

encrypting, within the first module, the first data, prior to transmitting the first data to the second module over the bus; and refraining from encrypting, within the first module, the second data, prior to transmitting the second data to the third module over the bus.

19. The method of claim 17, further comprising:

receiving, by the first module and over the bus, third data from the second module and fourth data from the third module; and determining (i) that the third data is received from the second module that supports transmitting data at both the lower frequency and the higher frequency, and (ii) that the fourth data is received from the third module that supports transmitting data at the lower frequency;

decrypting the third data, and subsequently transmitting the third data to the first device; and transmitting the fourth data to the first device, without decrypting the fourth data.

* * * * *